United States Patent
Schmatloch et al.

(10) Patent No.: US 11,732,080 B2
(45) Date of Patent: Aug. 22, 2023

(54) COMPOSITIONS CONTAINING HYDROPHOBIC MODIFIED ISOCYANATE FUNCTIONAL PREPOLYMER CONTAINING ADHESIVES

(71) Applicant: DDP SPECIALTY ELECTRONICS MATERIALS US, LLC, Wilmington, DE (US)

(72) Inventors: Stefan Schmatloch, Freienbach (CH); Ilona Caderas, Freienbach (CH)

(73) Assignee: DDP SPECIALTY ELECTRONICS MATERIALS US, INC., Wilmington, DE (US)

( * ) Notice: Subject to any disclaimer, the term of this patent is extended or adjusted under 35 U.S.C. 154(b) by 819 days.

(21) Appl. No.: 16/617,039

(22) PCT Filed: Jun. 15, 2018

(86) PCT No.: PCT/US2018/037754
§ 371 (c)(1),
(2) Date: Nov. 26, 2019

(87) PCT Pub. No.: WO2018/232239
PCT Pub. Date: Dec. 20, 2018

(65) Prior Publication Data
US 2021/0130529 A1        May 6, 2021

Related U.S. Application Data

(60) Provisional application No. 62/520,075, filed on Jun. 15, 2017.

(51) Int. Cl.
| | |
|---|---|
| C09J 175/08 | (2006.01) |
| C08G 18/12 | (2006.01) |
| C08G 18/22 | (2006.01) |
| C08G 18/32 | (2006.01) |
| C08G 18/48 | (2006.01) |
| C08G 18/69 | (2006.01) |
| C08G 18/79 | (2006.01) |
| C08K 3/34 | (2006.01) |
| C08K 3/36 | (2006.01) |
| C08K 9/06 | (2006.01) |
| C09J 5/06 | (2006.01) |

(52) U.S. Cl.
CPC .......... *C08G 18/12* (2013.01); *C08G 18/227* (2013.01); *C08G 18/3206* (2013.01); *C08G 18/4841* (2013.01); *C08G 18/698* (2013.01); *C08G 18/797* (2013.01); *C08G 18/798* (2013.01); *C08K 3/346* (2013.01); *C08K 3/36* (2013.01); *C08K 9/06* (2013.01); *C09J 5/06* (2013.01); *C09J 175/08* (2013.01); *C09J 2301/312* (2020.08)

(58) Field of Classification Search
CPC .... C08G 18/10; C08G 18/12; C08G 18/3206; C08G 18/69; C08G 18/698; C09J 175/04
See application file for complete search history.

(56) References Cited

U.S. PATENT DOCUMENTS

| | | | |
|---|---|---|---|
| 4,923,756 A | 5/1990 | Chung et al. | |
| 5,162,481 A | 10/1992 | Reid et al. | |
| 5,183,877 A | 2/1993 | Swanson | |
| 5,410,009 A | 4/1995 | Kato et al. | |
| 5,994,466 A | 11/1999 | Yang | |
| 6,365,674 B1 | 4/2002 | Kaufhold et al. | |
| 2009/0163673 A1 | 6/2009 | Shah et al. | |
| 2011/0039968 A1 | 2/2011 | Vairo | |
| 2012/0156505 A1 | 6/2012 | Shah et al. | |
| 2013/0041108 A1* | 2/2013 | Kennedy | C08G 18/5024 525/131 |
| 2013/0102697 A1 | 4/2013 | Shinchi et al. | |
| 2015/0087442 A1* | 3/2015 | Ichikawa | C08K 3/22 473/376 |
| 2015/0259583 A1 | 9/2015 | Kahle et al. | |

(Continued)

FOREIGN PATENT DOCUMENTS

| | | |
|---|---|---|
| CN | 1126232 | 7/1996 |
| CN | 102585162 A | 7/2012 |

(Continued)

OTHER PUBLICATIONS

CN1126232 Abstract, year: 1996.

(Continued)

*Primary Examiner* — Michael M Dollinger

(57) ABSTRACT

Disclosed are curable compositions containing isocyanate functional prepolymer containing two part adhesives wherein the prepolymers contain in their backbones hydrophobic segments and the curative part comprises one or more oligomeric or polymeric compounds having more than one isocyanate reactive groups; and one or more low molecular weight compounds having more than one isocyanate reactive groups wherein the low molecular weight compounds and the amount of such low molecular weight compounds are selected to such that the composition after full cure exhibits a ratio of modulus (e.g., Young's modulus or shear storage modulus) measured at −35° C. to the modulus measured at 23° C. of less than 10. The cured compositions exhibit higher stiffness across the common use temperature range and improved hydrolytic stability especially when exposed to elevated temperatures. Also disclosed are methods of bonding substrates together utilizing such compositions.

20 Claims, No Drawings

(56) References Cited

U.S. PATENT DOCUMENTS

| | | |
|---|---|---|
| 2017/0233604 A1 | 8/2017 | Watkins et al. |
| 2017/0321083 A1 | 11/2017 | Fenn et al. |
| 2017/0334183 A1 | 11/2017 | Kimura et al. |
| 2017/0341296 A1 | 11/2017 | Fenn et al. |
| 2017/0355865 A1 | 12/2017 | Fenn et al. |
| 2018/0155590 A1 | 6/2018 | Schmatloch et al. |

FOREIGN PATENT DOCUMENTS

| | | |
|---|---|---|
| EP | 0304083 | 2/1989 |
| EP | 0376674 | 7/1990 |
| EP | 0538694 | 4/1993 |
| EP | 0579989 | 1/1994 |
| EP | 1710263 | 10/2006 |
| EP | 2072249 | 6/2009 |
| EP | 2468787 | 6/2012 |
| GB | 2055869 | 11/1981 |
| JP | H02258877 A | 10/1990 |
| JP | 3204746 | 9/2001 |
| JP | 2006199889 | 8/2006 |
| JP | 2006-233081 A | 9/2006 |
| JP | 2007-284625 A | 11/2007 |
| JP | 2008139743 A | 6/2008 |
| JP | 2016204978 | 12/2016 |
| JP | 2018524429 A | 8/2018 |
| WO | 199856841 | 12/1998 |
| WO | 2008149180 | 12/2008 |
| WO | 2009039145 | 3/2009 |
| WO | 2009058420 | 5/2009 |
| WO | 2009129393 | 10/2009 |
| WO | 2010052671 | 5/2010 |
| WO | 2014138218 | 9/2014 |
| WO | 2016044973 | 3/2016 |
| WO | 2016085914 | 6/2016 |
| WO | 2016152370 | 9/2016 |
| WO | 2017083380 | 5/2017 |
| WO | 2018-160945 A1 | 9/2018 |

OTHER PUBLICATIONS

JP03204746 Abstract, year: 1991.
JP20061999889 Abstract, year: 2006.
WO2016152370 Abstract, year: 2016.
JP2006-233081 English Abstract, year: 2006.
JP2007-284625 English Abstract, year: 2007.
Qi, Cao et al., Study on synthesis of polyurethane elastomer by liquefaction modified MDI and butyl hydroxide adhesive, Polymer materials science and engineering, vol. 19, Issue 2, year: 2003.

\* cited by examiner

COMPOSITIONS CONTAINING HYDROPHOBIC MODIFIED ISOCYANATE FUNCTIONAL PREPOLYMER CONTAINING ADHESIVES

CLAIM OF PRIORITY

The present application claims the benefit of priority to U.S. Provisional Patent Application 62/520,075 filed on Jun. 15, 2017, which is incorporated by reference in its entirety.

FIELD

The invention relates to curable compositions containing isocyanate functional prepolymer containing adhesives wherein the prepolymers contain in their backbones hydrophobic segments. The cured compositions exhibit higher stiffness across the common use temperature range and improved hydrolytic stability especially when exposed to elevated temperatures. Also disclosed are methods of bonding substrates together utilizing such compositions.

BACKGROUND

Compositions having isocyanate functional components are utilized in a variety of useful products such as adhesives, molded products and foams. Such compositions are utilized in construction, vehicle manufacture, assembly of electronic sub-assemblies and devices, toys and the like. The adhesives are used to bond substrates together and have found widespread use because they allow for reasonable processing conditions and exhibit good adhesion to many substrates. Two-part polyisocyanate based adhesives comprise, in one part, an isocyanate functional prepolymer and in a second part a curing agent and catalyst for the reaction of the curing agent with isocyanate groups. The curing agent is a compound having on average more than one active hydrogen atom, for instance an amine or hydroxyl moiety. Two part adhesives are often used for bonding parts to together or to other structures, for example bonding trim parts to vehicles or bonding replacement windows into vehicles. These systems are being utilized more and more for bonding structural parts of assemblies, including vehicles, together. Examples of such adhesive systems include those disclosed in US 2016/068724 (WO2014/184264); US 2016/0053147 (WO2014/184270); and US 2015/159064 (WO2014/029891), all incorporated herein by reference in their entirety. The adhesive starts to cure when the two parts are contacted. Two-part adhesives have the advantage that they cure much faster than one-part adhesives.

Two part adhesives are used in a number of applications, such as in automobiles, where the cured adhesives are exposed to a wide range of temperatures, for instance from −35° C. to 85° C. and to wet environments at elevated temperatures. Many two part adhesives exhibit a rapid drop in stiffness, as measured by Young's Modulus, when exposed to higher temperatures in the recited range. Further many such adhesives exhibit a significant loss in properties when exposed to moisture at elevated temperatures. In many applications the cured adhesives need to absorb and/or transfer significant energy and continue to maintain adhesion between the substrates bonded.

What is needed is an adhesive system which exhibits good green strength, rapid cure rates and allows substrates to be handled shortly after application of the adhesive system, which exhibits low drop in stiffness with exposure to increased temperatures and resistance to degradation of properties when exposed to moisture at elevated temperatures, and exhibits excellent energy absorbance properties.

SUMMARY

Disclosed is a composition comprising two parts wherein Part 1 comprises: a) one or more prepolymers having isocyanate functional groups and the residue of hydrophobic segments in the backbone of the prepolymers wherein the residue of the hydrophobic segments is present in a sufficient amount such that the polyurethane prepared from the prepolymer exhibits two phases in the temperature range of from about −35° C. to about 85° C. and/or the change in modulus (e.g., Young's modulus or shear storage modulus) measured after both of 7 days curing at 23° C. at 50 percent relative humidity and 7 days Cataplasm exposure as compared to the modulus (e.g., Young's modulus or shear storage modulus) after 7 days curing at 23° C. at 50 percent relative humidity wherein the difference is 25 percent or less; and Part 2 comprises: b) one or more oligomeric or polymeric compounds having more than one isocyanate reactive groups; and c) one or more low molecular weight compounds having more than one isocyanate reactive groups wherein the low molecular weight compounds and the amount of such low molecular weight compounds are selected to such that the composition after full cure exhibits a ratio of modulus (e.g., Young's modulus or shear storage modulus) measured at −35° C. to modulus (e.g., Young's modulus or shear storage modulus) measured at 23° C. of less than 10. The hydrophobic segments may be derived from polyols containing the hydrophobic segments. The hydrophobic segments may comprise hydrophobic ester units derived from polyester diols, straight or branched chain butylene groups or polybutadiene segments. The hydrophobic segments may be derived from polybutadiene, butane diol, butylene oxide, tetrahydrofuran, or hydrophobic esters. The one or more isocyanate functional prepolymers may be derived from about 20 to about 60 percent by weight of one or more polyols containing hydrophobic segments and, optionally, one or more polyols containing one or more hydrophilic segments. The one or more low molecular weight compounds having more than one isocyanate reactive groups may comprise one or more C alkylene compounds having more than one isocyanate reactive groups. The one or more prepolymers having isocyanate functional groups may have an isocyanate functionality of about 2.0 to about 3.0.

The two part composition may comprise in Part 1 a) from about 5 to about 40 percent by weight of the one or more prepolymers having isocyanate functional groups and the residue of hydrophobic segments in the backbone of the prepolymers; and in Part 2 b) from about 20 to about 60 percent by weight of the one or more oligomeric or polymeric compounds having more than one isocyanate reactive groups; and c) from about 2 to about 15 percent by weight of the one or more low molecular weight compounds having more than one isocyanate reactive groups; wherein the amounts are based on the weight of the composition. Part 1 may comprise one or more polyisocyanates, such polyisocyanates may not be in the form or prepolymers.

Disclosed is a method of bonding two or more substrates together comprising i) contacting Part 1 and Part 2 of a composition disclosed herein; ii) contacting the mixture of step i) with one or more substrates; iii) contacting the substrates together with the mixture of step i) disposed between the substrates; iv) allowing the mixture of step i) to cure so as to bond the substrates together. Cure of the mixture of step i) may be accelerated by exposing the substrates with the mixture of step i) disposed between the substrates to elevated temperatures.

Disclosed is a method comprising a) contacting Part 1 and Part 2 of a composition as disclosed herein and mixing to form a homogeneous mixture; b) applying the mixture to a first substrate; c) contacting a second substrate with the first substrate with the mixture of part a disposed between the first and second substrate; and d) exposing a portion of the mixture to heat under conditions such that the mixture partially cures sufficiently such that the first and second substrate are bonded such that the substrates can be moved. This method may include e) heating the two substrates at a temperature for a time to fully cure the mixture to bond the two substrates together. The heat may be applied in step d) by infrared heating. The time frame between steps d) and e) may be about 24 hours or more.

The compositions are useful in any known use of curable compositions containing isocyanate functional components, such as coatings, adhesives, open and closed cell foams, molded products and the like. The curable compositions may be used as adhesives to bond substrates together. A variety of similar and dissimilar, porous and nonporous, substrates may be bonded together using the compositions, for instance, plastics, glass, wood, ceramics, metal, coated substrates and the like. The compositions are useful for bonding fiber reinforced plastic or coated metal substrates. The disclosed compositions demonstrate good stiffness at elevated temperatures, for example a modulus (e.g., Young's modulus or shear storage modulus) after 7 days cure at 23° C. and 50 percent relative humidity measured at 85° C. of about 35 MPa or greater or about 40 MPa or greater. The disclosed compositions demonstrate good retention of stiffness, as measured by modulus (e.g., Young's modulus or shear storage modulus), across the spectrum of anticipated use temperatures such as from −35° C. to 85° C. The compositions may exhibit a ratio of modulus (e.g., Young's modulus or shear storage modulus) after 7 days cure at 23° C. and 50 percent relative humidity measured at 23° C. and measured at 85° C. is about 10 or less, or about 3 to 7. The compositions may exhibit a ratio of modulus (e.g., Young's modulus or shear storage modulus) after 7 days cure at 23° C. and 50 percent relative humidity measured at −35° C. and measured at 23° C. is about 10 or less, or about 3 to 7. The compositions disclosed exhibit excellent hydrolytic stability. This is shown by measuring the change in modulus (e.g., Young's modulus or shear storage modulus) measured after both of 7 days curing at 23° C. at 50 percent relative humidity and 7 days Cataplasm exposure as compared to the modulus after 7 days curing at 23° C. at 50 percent relative humidity wherein the difference is 25 percent or less, 20 percent or less, 15 percent or less or 12 percent or less. The compositions exhibit glass transition temperatures of −30° C. or less, preferably −35° C. or less, which is at the low end or below common use temperatures. The compositions exhibit excellent energy absorbance as measured by Tan Delta, for example they may exhibit tan deltas of 33 or greater or 60 or greater.

DETAILED DESCRIPTION

The disclosures of all articles and references, including patent applications and publications, are incorporated by reference for all purposes. The following claims are also hereby incorporated by reference into this written description.

One or more as used herein means that at least one, or more than one, of the recited components are present. Nominal functionality means the theoretical functionality, which can be calculated from the stoichiometry of the ingredients used. The actual functionality is different due to imperfections in raw materials, incomplete conversion of the reactants and formation of by-products. Isocyanate content means the weight percentage of isocyanate moieties based on the total weight of the isocyanate components. The term "isocyanate-reactive compound" as used herein includes any organic compound having nominally at least two isocyanate-reactive moieties. For the purposes of this invention, an active hydrogen containing moiety refers to a moiety containing a hydrogen atom which, because of its position in the molecule, displays significant activity according to the Zerewitinoff test described by Wohler in the *Journal of the American Chemical Society*, Vol. 49, p. 3181 (1927). Illustrative of such active hydrogen moieties are —COOH, —OH, —NH$_2$, —NH—, —CONH$_2$, —SH, and —CONH—. Exemplary isocyanate-reactive compounds (active hydrogen containing compounds) include polyols, polyamines, polymercaptans and polyacids; or polyols. Aromatic isocyanate group means an isocyanate group covalently bonded to an aromatic carbon atom. Aliphatic isocyanate group means an isocyanate group covalently bonded to an aliphatic carbon atom.

Disclosed are two part compositions that comprise in one part one or more prepolymers having isocyanate functional groups and the residue of hydrophobic segments in the backbone of the prepolymers wherein the residue of the hydrophobic segments is present in a sufficient amount such that the polyurethane prepared from the prepolymer exhibits two phases in the temperature range of from about −35° C. to about 85° C. and/or the change in modulus (e.g., Young's modulus or shear storage modulus) measured after both of 7 days curing at 23° C. at 50 percent relative humidity and 7 days Cataplasm exposure as compared to the modulus after 7 days curing at 23° C. at 50 percent relative humidity wherein the change difference is 25 percent or less and in a second part b) one or more oligomeric or polymeric compounds having more than one isocyanate reactive groups; and c) one or more low molecular weight compounds having more than one isocyanate reactive groups wherein the low molecular weight compounds and the amount of such low molecular weight compounds are selected to such that the composition after full cure exhibits a ratio of modulus (e.g., Young's modulus or shear storage modulus) measured at −35° C. to modulus measured at 23° C. of less than 10. The compositions are reactive systems containing isocyanate functional components which are curable. Reactive means herein that the curable composition (e.g. adhesive) contains components which react to form a polymeric matrix that is set irreversibly once cured. The curable systems are two-part systems, which may be useful as adhesives. The two parts are reactive with one another and when contacted undergo cure. One part of the composition comprises, or contains, one or more prepolymers containing isocyanate functional groups, typically referred to as the resin side or A side. The other component comprises one or more isocyanate reactive components which comprises, or contains, one or more compounds, oligomers or prepolymers having on average more than one group reactive with isocyanate moieties, commonly known as the curative or B side. Compounds having on average one or more isocyanate reactive groups can be compounds, prepolymers, small chain compounds such as difunctional chain extenders or polyfunctional cross-linking agents known in the art or mixtures thereof. A catalyst as described herein may be utilized in the curative side. The reaction product is a cured product which is capable of performing the desired function, such as bonding certain substrates together.

Prepolymers having isocyanate functional groups contain one or more compounds having on average more than one isocyanate functional group per molecule. The isocyanate functional compounds can be any compounds which contain on average more than one isocyanate moiety. The isocyanate functional prepolymers, monomers or oligomers having on average greater than 1 isocyanate group, or 2 or more isocyanate groups. The isocyanate prepolymers having isocyanate functional groups can by any prepolymers prepared by reaction of an isocyanate functional compound with one or more compounds having on average more than one isocyanate reactive functional groups, such as hydroxyl, amine, thiol, carboxyl and the like, under conditions such that the prepolymers prepared have on average more than one isocyanate group per molecule. The prepolymers having isocyanate functional groups are present in the curable composition in a sufficient amount to form a cured component when exposed to curing conditions. The prepolymers having isocyanate functional groups when combined with isocyanate reactive compounds are capable of bonding substrates together in a manner that the substrates remain bound together when exposed to temperatures of −35° C. to 85° C. for long periods of time, such as 10 years; and up to temperatures of 180° C. for short periods of up to 30 minutes.

The prepolymers containing isocyanate functional groups are present in the curable composition in a sufficient amount to form a cured component when exposed to curing conditions. The prepolymers may be present in sufficient quantity to provide cohesive strength, and in adhesive uses, adhesive character to the composition. Isocyanate functional prepolymers have an average isocyanate functionality sufficient to allow the preparation of a crosslinked polyurethane upon cure and not so high that the prepolymers are unstable. The prepolymers are prepared by reacting one or more polyisocyanates with one or more compounds containing on average more than one isocyanate reactive group per molecule. The isocyanate functional prepolymers are the reaction product of one or more polyisocyanates and one or more isocyanate reactive compounds wherein an excess of polyisocyanate may be present on equivalent basis. The prepolymer may have a free isocyanate content which facilitates acceptable strength in the compositions prepared from the prepolymers, for example after 60 minutes. The isocyanate prepolymers may be used in admixture with unreacted polyisocyanates. This mixture may be a result of reacting excess polyisocyanates with isocyanate reactive compounds. With an excess of polyisocyanates the resulting reaction product will contain unreacted polyisocyanates. The resulting reaction mixture may be used without separating out the polyisocynates. Additional polyisocyanates may be added to the resulting isocyanate functional prepolymers. The isocyanate content of part 1 including all of the isocyanate function components may be about 5 percent by weight or greater or about 7 by weight or greater. The isocyanate content of the part 1 may be about 32 percent by weight or less, about 25 percent by weight or less or about 17 percent by weight or less. The prepolymers may exhibit a polydispersity of about 2.5 or less, about 2.3 or less or about 2.1 or less.

Exemplary polyisocyanates useful in preparing isocyanate functional prepolymers include any aliphatic, cycloaliphatic, araliphatic, heterocyclic or aromatic polyisocyanates, or mixtures thereof. The polyisocyanates used may have an average isocyanate functionality of about 2.0 or greater and an equivalent weight of about 80 or greater. The isocyanate functionality of the polyisocyanates may be about 2.0 or greater, about 2.2 or greater, or about 2.4 or greater. The polyisocyanates used may have an average isocyanate functionality of about 4.0 or less, about 3.5 or less, or about 3.0 or less. Higher functionality may be used, but may cause excessive cross-linking and result in a composition which is too viscous to handle and apply easily, and can cause the cured composition to be too brittle. The equivalent weight of the polyisocyanates may be about 80 or greater, about 110 or greater, or about 120 or greater. The equivalent weight of the polyisocyanates may be about 900 or less about 700 or less, or about 500 or less. Exemplary aliphatic polyisocyanates include those disclosed by Wu, U.S. Pat. No. 6,512,033 at column 3, line 3 to line 49, incorporated herein by reference, and include. isophorone diisocyanate, tetramethylxylene diisocyanate, 1,6-hexamethylene diisocyanate and oligomeric or polymeric derivatives thereof, bis(4-isocyanato-cylohexyl)methane, and trimethyl hexamethylene diisocyanate. The aliphatic isocyanates may be hexamethylene diisocyanate or oligomeric and polymeric derivatives thereof. Examples of aliphatic isocyanates include trimers of hexamethylene diisocyanate, such as those available from Bayer under the trademark and designation DESMODUR N3300, DESMODUR N3400, DESMODUR N-100. Exemplary aromatic polyisocyanates include those disclosed by Wu, U.S. Pat. No. 6,512,033 at column 3, line 3 to line 49, incorporated herein by reference and include diphenylmethane diisocyanate, toluene diisocyanate and polymeric derivatives thereof. The aromatic isocyanate may be diphenylmethane diisocyanate. The amount of isocyanate containing compound used to prepare the prepolymer is that amount that gives the desired properties, the appropriate free isocyanate content and viscosities as discussed herein. Oligomeric aromatic polyisocyanates useful include those available from The Dow Chemical Company under the trademarks PAPI and VORANATE, such as VORANTE M220, PAPI 27 and PAPI 20 polymeric isocyanates.

The isocyanate functional prepolymers comprise one or more isocyanate prepolymers having hydophobic segments in the backbone or the prepolymers. Hydrophobic segments are segments which result in the cured polyurethane structures exhibiting two phases across the use temperatures as disclosed herein, and/or the change in Young's modulus (e.g., Young's modulus or shear storage modulus) measured after both of 7 days curing at 23° C. at 50 percent relative humidity and 7 days Cataplasm exposure as compared to the modulus after 7 days curing at 23° C. at 50 percent relative humidity wherein the difference is 25 percent or less. The hydrophobic segments may be incorporated into the isocyanate prepolymers by reaction polyisocyanates with isocyanate reactive oligomers and/or polymers containing hydrophobic segments. The hydrophobic segments may comprise alkylene, alkenylene or hydrophobic ester segments which result the cured polyurethane structures exhibiting two phases across the use temperatures as disclosed herein and/or the change in modulus (e.g., Young's modulus or shear storage modulus) measured after both of 7 days curing at 23° C. at 50 percent relative humidity and 7 days Cataplasm exposure as compared to the modulus after 7 days curing at 23° C. at 50 percent relative humidity wherein the difference is 25 percent or less. The alkylene or alkenylene segments may be straight or branched chain segments. The segments may comprise polymeric or oligomeric segments containing alkylene or alkenylene units. The segments may comprise a number of such units reacted together or may be linked by heteroatom containing functional groups. The heteroatom functional groups may be ether, thioether, amino, ester, thioester or the like. The segments may contain ether linkages between alkylene groups. The segments may be based on $C_{4-8}$ alkylene or alkenylene groups, $C_{4-8}$ alkylene or alkenylene groups, or $C_{4-5}$ alkylene or alkenylene groups. The segments may be based on $C_{4-8}$ dienes, such as butadiene, isoprene or the like. Such segments may comprise polydienes, for instance polyisoprene or polybutadiene. The dienes may conjugated dienes. The hydrophobic segments may be based on butylene oxide units or poybutadiene units. The hydrophobic segments may be based on hydrophobic diesters. Hydrophobic esters may include dihydrocarbyl dicarboxylates which are compounds with two ester groups having a hydrocarbylene group disposed between the ester groups. The one or more dihydrocarbyl dicarboxylates comprise one or more of aromatic dicarboxylates, aliphatic dicarboxylates and cycloaliphatic dicarboxylates or may be one or more dihydrocarbyl dicarboxylates wherein one of the hydrocarbyl groups is aliphatic, cycloaliphatic or aromatic and the other is selected from another class of aliphatic, cycloaliphatic or aromatic. The one or more dihydrocarbyl dicarboxylates comprise one or more of aromatic dicarboxylates having 8 to 14 carbon atoms in the backbone, aliphatic dicarboxylates having 1 to 12 carbon atoms in the backbone and cycloaliphatic dicarboxylates having 8 to 12 carbon atoms in the backbone. The one or more dihydrocarbyl dicarboxylates comprise one or more malonates, terephthalates, phthalates, isophthalates, naphthalene-2,6-dicarboxylates, 1,3-phenylenedioxy diacetates, cyclohexane-dicarboxylates, cyclohexanediacetates, diphenyl-4,4'-dicarboxylates, succinates, glutarates, adipates, azelates, sebacates, or mixtures thereof. The hydropobic segments may comprise the residue of polycarbonate polyols. The hydrophobic segments may be incorporated in the isocyanate functional prepolymers by reacting oligomers or polymers containing such units in their backbone and terminal isocyanate reactive groups. The isocyanate reactive groups may be any known groups which react with isocyanate functional compounds. Such reactive groups may be amino or hydroxyl groups. Such reactive groups may be hydroxyl groups. Exemplary oligomers and/or polymers containing isocyanate reactive groups include polybutylene oxides based polyols, polybutadiene based polyols, polyester diols derived from diols and diesters, for instance adipinic acid ester based polyols, particularly 3-methyl-1,5 pentandiol adipinic acid ester polyols, terephthalic acid ester based polyols, particularly 3-methyl-1,5 pentandiol terephthalic acid ester based polyols, polycarbonate based polyols and the like. The isocyanate reactive oligomers and/or polymers containing hydrophobic segments have equivalent weights such that the desired improvements in properties are imparted to the cured compositions. The isocyanate reactive oligomers and/or polymers containing hydrophobic segments may have equivalent weights of about 500 or greater, about 1000 or greater or about 2000 or greater. The isocyanate reactive oligomers and/or polymers containing hydrophobic segments may have equivalent weights of about 15000 or less, about 25000 or less or about 35000 or less.

The isocyanate functional prepolymers may contain only hydrophobic segments in the backbone or contain a mixture of hydrophobic and non-hydrophobic, or hydrophilic, segment in their backbone provided there are sufficient hydrophobic segments such that the polyurethane prepared from the prepolymer exhibits two phases in the temperature range of from about −35° C. to about 85° C. and/or the change in modulus (e.g., Young's modulus or shear storage modulus) measured after both of 7 days curing at 23° C. at 50 percent relative humidity and 7 days Cataplasm exposure as compared to the modulus after 7 days curing at 23° C. at 50 percent relative humidity wherein the difference is 25 percent or less. The isocyanate functional prepolymers which contain both hydrophobic and non-hydrophobic, hydrophilic, segments may be prepared from copolymers having two or more isocyanate reactive functional groups, such as hydroxyl groups, containing both hydrophobic and non-hydrophobic, hydrophilic, segments or from a mixture of two or more oligomers and/or polymers having two or more isocyanate reactive functional groups, such as hydroxyl groups, wherein at least one has a hydrophobic units in the backbone and at least one that does not have hydrophobic units in the backbone, that it has non-hydrophobic units or hydrophilic units in the backbone. When a mixture of oligomers and/or polymers having isocyanate reactive groups with hydrophobic units in the backbone and oligomers and/or polymers having isocyanate reactive groups with non-hydrophobic units in the backbone are used about 20 percent by weight of the mixture or greater comprise oligomers and/or polymers having isocyanate reactive groups with hydrophobic units in the backbone, about 40 percent by weight or greater, about 50 percent by weight or greater or about 60 percent by weight or greater. When a mixture of oligomers and/or polymers with having isocyanate reactive groups and hydrophobic units in the backbone and oligomers and/or polymers having isocyanate reactive groups with non-hydrophobic units in the backbone are used, about 100 percent by weight of the mixture or less comprise oligomers and/or polymers having isocyanate reactive groups with hydrophobic units in the backbone or about 80 percent by weight or less, or about 60 percent by weight or less. When a mixture of oligomers and/or polymers having isocyanate reactive groups with hydrophobic units in the backbone and oligomers and/or polymers having isocyanate reactive groups with non-hydrophobic units in the backbone are used, about 0 percent by weight of the mixture or greater comprise oligomers and/or polymers having isocyanate reactive groups with non-hydrophobic units in the backbone, about 20 percent by weight or greater, about 40 percent by weight or greater. When a mixture of oligomers and/or polymers having isocyanate reactive groups with hydrophobic units in the backbone and oligomers and/or polymers having isocyanate reactive groups with non-hydrophobic units in the backbone are used, about 80 percent by weight of the mixture or less comprise oligomers and/or polymers with non-hydrophobic units having isocyanate reactive groups in the backbone or about 50 percent by weight or less, or about 40 percent by weight or less. The oligomers and/or polymers having isocyanate reactive groups with hydrophobic units in the backbone may be hydrophobic polyols or copolymers having both hydrophobic and non-hydrophobic segments in the backbone of the polyols. The oligomers and/or polymers having isocyanate reactive groups with non-hydrophobic units may be non-hydrophobic, or hydrophilic, polyols.

The isocyanate reactive compounds may be present in isocyanate functional prepolymers in an amount sufficient to react with most of the isocyanate groups of the isocyanates leaving enough isocyanate groups to correspond with the desired free isocyanate content of the prepolymer. The total amount of the segments from the compounds containing two or more isocyanate reactive groups incorporated into the backbone of the prepolymers having isocyanate functional groups may be about 40 percent by weight or greater based on the weight of the prepolymer, about 25 (60) percent by weight or greater or about 70 percent by weight or greater. The total amount of the segments from the compounds containing two or more isocyanate reactive groups incorporated into the backbone of the prepolymers having isocyanate functional groups may be about 98 percent by weight or less based on the weight of the prepolymer, about 95 percent by weight or less or about 90 percent by weight or less. The total amount of hydrophobic segments incorporated into the backbone of the prepolymers having isocyanate functional groups may be about 4 percent by weight or greater based on the weight of the prepolymer, about 5 percent by weight or greater, about 7 percent by weight of greater, about (40 percent by weight or greater, about 60 percent by weight or greater or about 95 percent by weight or greater. The total amount of the hydrophobic segments incorporated into the backbone of the prepolymers having isocyanate functional groups may be about 98 percent by weight or less based on the weight of the prepolymer, about 95 percent by weight or less, about (90 percent by weight or less, about 45 percent by weight or less or about 40 percent by weight or less.

The non-hydrophobic or hydrophilic polymers containing isocyanate reactive groups which may be introduced into the backbone of the isocyanate functional prepolymers include polyols known in the art which are useful in preparing adhesive compositions. Such polyols useful in the preparation of the prepolymers include those disclosed in Wu, U.S. Pat. No. 6,512,033 at column 4, line 10 to line 64, incorporated herein by reference. Exemplary polyols include polyether polyols, polyester polyols, poly(alkylene carbonate) polyols, hydroxyl containing polythioethers and mixtures thereof. The polyols may be polyether polyols containing one or more alkylene oxide units in the backbone of the polyol. Preferred alkylene oxide units are ethylene oxide, propylene oxide, butylene oxide and mixtures thereof. The alkylene oxides can contain straight or branched chain alkylene units. The polyols may contain propylene oxide units, ethylene oxide units or a mixture thereof. Where a mixture of alkylene oxide units is contained in a polyol, the different units can be randomly arranged or arranged in blocks of each alkylene oxide. The polyols may comprise propylene oxide chains with ethylene oxide chains capping the polyol. The polyols may be a mixture of diols and triols. The residue of non-hydrophobic or hydrophilic polymers containing isocyanate reactive groups may be present in the isocyanate functional prepolymers in the amount of about 0 percent by weight or greater based on the weight of the prepolymer, about 1 percent by weight or greater, about 4 percent by weight or greater, about 8 percent by weight or greater or about 10 percent by weight or greater. The total amount of the hydrophobic segments incorporated into the backbone of the prepolymers having isocyanate functional groups may be about 90 percent by weight or less based on the weight of the prepolymer, about 95 percent by weight or less, about 36 percent by weight or less or about 30 percent by weight or less.

The isocyanate-reactive compounds may have a functionality of about 1.9 or greater, about 1.95 or greater, or about 2.0 or greater. The isocyanate-reactive compounds may have a functionality of about 4.0 or less, about 3.5 or less, or about 3.0 or less. The equivalent weight of the isocyanate-reactive compounds may be about 200 or greater, about 500 or greater, or about 1,000 or greater. The equivalent weight of the isocyanate-reactive compounds may be about 5,000 or less, about 3,000 or less, or about 2,500 or less.

The compositions may further comprise one or more isocyanate functional prepolymers or isocyanate reactive compounds in the form of prepolymers containing one or more organic based polymers dispersed therein or grafted to the backbone. Exemplary organic base polymer containing triols are disclosed in Zhou, U.S. Pat. No. 6,709,539 at column 4, line 13 to column 6, line 18, incorporated herein by reference. The triols used to disperse or graft the organic particles may be one or more polyether triols and or may be one or more polyoxyalkylene based triols, which comprise polyoxypropylene chains with a polyoxyethylene end caps. The triols may be ethylene oxide-capped polyols prepared by reacting glycerin with propylene oxide, followed by reacting the product with ethylene oxide. The organic particles may comprise one or more of thermoplastic polymers, rubber-modified thermoplastic polymers or polyureas. Such prepolymers containing organic particles may be contained in the composition in an amount of about 5 percent by weight or greater. Such prepolymers containing organic particles may be contained in the composition in an amount of about 40 percent by weight or less.

The prepolymers may be prepared by any suitable method, such as bulk polymerization and solution polymerization. The process may be carried out under anhydrous conditions, preferably under an inert atmosphere, such as a nitrogen blanket, to prevent crosslinking of the isocyanate groups by moisture. The reaction is preferably carried out at a temperature from about 0° C. to about 150° C., more preferably from about 25° C. to about 90° C., until the residual isocyanate content determined by titration of a sample is very close to the desired theoretical value. The reactions to prepare the prepolymer may be carried out in the presence of urethane catalysts, for example stannous salts of carboxylic acids, such as stannous octoate, stannous oleate, stannous acetate, and stannous laurate; dialkyltin dicarboxylates, such as dibutyltin dilaurate and dibutyltin diacetate; tertiary amines and tin mercaptides. The catalyst may be stannous octoate. The amount of catalyst employed may be from about 0.005 to about 5 parts by weight of the mixture catalyzed.

The prepolymers containing isocyanate functional groups may be present in the Part 1 of the composition. The prepolymers containing isocyanate functional groups may be present in the composition in an amount sufficient to impart adhesive properties to the composition and to provide the desired properties as disclosed herein. The prepolymers containing isocyanate functional groups may be present in the composition in an amount of about 5 percent by weight or greater based on the weight of the composition, about 10 percent by weight or greater or about 15 percent by weight or greater. The prepolymers containing isocyanate functional groups may be present in the composition in an amount of about 40 percent by weight or less based on the weight of the composition, about 35 percent by weight or less or about 30 percent by weight or less.

Part 1 may further contain one or more polyisocyanates including any of the polyisocyanates described as useful in preparing isocyanate functional prepolymers, In this context, the polyisocyanates are not in the form of prepolymers prepared by reacting polyisocyanates with polyols. The polyisocyanates may be present in a sufficient amount to provide desired adhesives physical properties and to provide sufficient adhesion to described substrates. The polyisocyanates may be present in an amount based on the weight of the composition of about 1 percent by weight or greater, about 2 percent by weight or greater or about 4 percent by weight or greater. The polyisocyanates may be present in an amount based on the weight of the composition of about 10 percent by weight or less, about 7 percent by weight or less or about 6 percent by weight or less.

The compositions may comprise one or more curing agents located in the second part. Curing agents are compounds that contain greater than one isocyanate reactive group, preferably hydroxyl or amine functional groups. The curing agents can be one or more chain extenders, crosslinking agents, polyols or polyamines, or prepolymers as described herein having isocyanate reactive groups. Polyols as described hereinbefore can be utilized as curing agents.

The isocyanate functional curable compositions may further comprise one or more low molecular weight compounds having two or more isocyanate reactive groups and a hydrocarbon backbone wherein the backbone may further comprise one or more heteroatoms. Such low molecular weight compounds may be chain extenders, such compounds are difunctional, or crosslinkers, having greater than two active hydrogen groups per compound. The heteroatoms in the backbone can be oxygen, sulfur, nitrogen or a mixture thereof; oxygen, nitrogen or a mixture thereof; or oxygen. The molecular weight of the low molecular weight compound may be about 400 or less, about 120 or less or about 100 or less.

Part 2 of the disclosed composition contains di-functional low molecular weight compounds which improve the hydrolytic stability of the cured composition at elevated temperatures, which can be demonstrated by Cataplasm testing as discussed herein. Exemplary di-functional low molecular compounds having two isocyanate reactive groups which improve the hydrolytic stability of the cured composition at elevated temperatures include $C_{4-8}$ alkylene compounds having two isocyanate reactive groups. The di-functional low molecular compounds may be $C_{4-8}$ alkylene compounds having two isocyanate reactive groups or $C_{4-5}$ alkylene compounds having two isocyanate reactive groups. The alkylene segments may be straight or branched or may be straight. The isocyanate functional groups may be independently thiol, hydroxyl or amino. The isocyanate functional groups may be independently hydroxyl or amino. The isocyanate functional groups may be hydroxyl. Exemplary di-functional low molecular compounds having two isocyanate reactive groups which improve the hydrolytic stability of the cured composition at elevated temperatures may have a molecular weight of about 5 or greater or about 10 or greater. Exemplary di-functional low molecular compounds having two isocyanate reactive groups which improve the hydrolytic stability of the cured composition at elevated temperatures may have a molecular weight of about 400 or less or about 100 or less. Exemplary di-functional low molecular compounds having two isocyanate reactive groups include butane diol, pentane diol, hexane diol, heptane diol and octane diol. Exemplary di-functional low molecular compounds having two isocyanate reactive groups include butane diol and pentane diol. Blends of various low molecular weight compounds may be used. The low molecular compound may be located in the resin side, the curative side or both, or on the curative side. A di-functional low molecular compound may be incorporated into the curative side by reacting one or more hydroxyl functional prepolymers having a low molecular weight compound in the backbone with an equivalents excess of one or more polyisocyanates to prepare a isocyuante functional prepolymer. The di-functional low molecular weight compound having two isocyanate reactive groups are used in a sufficient amount to improve the hydrolytic stability of the cured compositions at elevated temperatures. The di-functional low molecular weight compound having two isocyanate reactive groups may be present in composition in an amount of about 2 percent by weight or greater, about 3 percent by weight or greater or about 6 percent by weight or greater. The di-functional low molecular compounds having two isocyanate reactive groups may be present in the composition in an amount of about about 12 percent by weight or less or about 10 percent by weight or less.

The curative part may further comprise polyoxyalkylene polyamine having 2 or greater amines per polyamine. The polyoxyalkylene polyamine may have 2 to 4 amines per polyamine or 2 to 3 amines per polyamine. The polyoxyalkylene polyamines may have a weight average molecular weight of about 200 or greater or about 400 or greater. The polyoxyalkylene polyamine may have a weight average molecular weight of about 5,000 or less or about 3,000 or less. Exemplary polyoxyalkylene polyamines are JEFFAMINE™ D-T-403 polypropylene oxide triamines having a molecular weight of about 400 and JEFFAMINE™ D-400 polypropylene oxide diamines having a molecular weight of about 400. The polyoxyalkylene polyamines are present in a sufficient amount to prevent the composition from sagging once mixed and applied. The poly-oxyalkylene polyamines may be present in the curable composition in an amount of about 0.2 percent by weight or greater, about 0.3 percent by weight or greater or about 0.5 percent by weight or greater. The polyoxyalkylene polyamines may be present in the curable composition in an amount of about 6 percent by weight or less, about 4 percent by weight or less or about 2 percent by weight or less.

The composition may comprise components to control the rheology, viscosity, pumpability and the sag characteristics. The materials included in the composition for these purposes include one or more fillers, one or more isocyanate functional polyester based prepolymers, or a mixture thereof. These materials are added in a sufficient amount such that the composition exhibits the desired rheology, viscosity and the sag characteristics. Preferably these components are added such that the composition exhibits a press flow viscosity (at room temperature, 4 bar pressure 2 mm nozzle, 18 mm length) of about 10 grams per minute or higher, about 15 grams per minute or higher or about 20 grams per minute or higher to allow for application by a manual dispensing gun.

The composition may comprises one or more fillers. Fillers are added for a variety of reasons as described hereinbefore and one or more types of fillers may be utilized in the composition of this invention. Fillers may be added to reinforce the composition, to impart the appropriate viscosity and rheology and to strike a balance between cost and the desired properties of the composition and the parts of the composition. Preferred classes of fillers comprise one or more reinforcing fillers, (such as one or more carbon blacks), one or more clays, talcum or non-pigmented fillers, one or more thixotropes or combinations thereof. Exemplary groups of fillers include those fillers that impart a balance of cost and viscosity to each part and comprise clays and non-pigmented fillers. Such fillers are used in a sufficient amount to impart an acceptable balance of viscosity and cost to the formulation and to achieve the desired properties of the composition. Among fillers useful for this purpose are clays, untreated and treated talc, and calcium carbonates. Exemplary clays include kaolin, surface treated kaolin, calcined kaolin, aluminum silicates and surface treated anhydrous aluminum silicates. Kaolin is also known as Kaolinite and comprises compounds represented by the chemical formula $Al_2Si_2O_5(OH)_4$, and it most often occurs as clay-sized, platelike, hexagonally shaped crystals. The clays can be used in any form which facilitates formulation of a composition having the desired properties, for example a composition that can be utilized a hand-dispensable adhesive. The clay may be admixed in the form of pulverized powder, spray-dried beads or finely ground particles. The clays or non-pigmented fillers are present in an amount sufficient to render the rheology of the composition suitable to function as desired, such as an adhesive applicable by hand-gun. The clays or non-pigmented fillers may be used in an amount of about 0 percent by weight or greater of the composition, about 3 percent by weight or greater, about 5 percent by weight or greater, about 10 percent by weight or greater or about 16 percent by weight or greater. The clays or non-pigmented fillers may be used in an amount of about 60 percent by weight or less of the composition or about 50 percent by weight or less.

The composition may further comprise fillers which function as thixotropes (rheological additives). Such thixotropes are well known to those skilled in the art and include fumed silica and the like. Preferred fumed silicas include organically modified fumed silicas. The thixotrope may be added to the composition in a sufficient amount to give the desired rheological properties. The thixotrope may be present in an amount of about 0 percent by weight or greater based on the weight of the composition, about 1 percent by weight or greater. The optional thixotrope may be present in an amount of about 10 percent by weight or less based on the weight of the composition, about 8 percent by weight, or about 6 or less.

The isocyanate functional component may further comprise a polyfunctional isocyanate for the purpose of improving the modulus of the composition in the cured form. "Polyfunctional" as used in the context of the isocyanates refers to isocyanates having a functionality of 2.4 or greater. The polyisocyanates can be any having a nominal functionality of about 2.4 or greater, about 2.7 or greater. The polyfunctional isocyanates may have a nominal functionality of about 5 or less, about 4.5 or less or about 4.2 or less. The polyfunctional isocyanates can be any isocyanates which are reactive with the isocyanate polyisocyanate prepolymers used in the composition and which improve the modulus of the cured composition. The polyisocyanates can be monomeric; trimeric isocyanurates or biurets of monomeric isocyanates; oligomeric or polymeric, the reaction product of several units of one or more monomeric isocyanates and can be aliphatic or aromatic. Exemplary aliphatic polyfunctional isocyanates include trimers of hexamethylene diisocyanate, such as those available from Bayer under the trademark and designation DESMODUR N3300, DESMODUR N3400, DESMODUR N-100. Examplary aromatic polyfunctional isocyanates include polymeric isocyanates such as polymeric MDI (methylene diphenyl diisocyanates) such as those marketed by The Dow Chemical Company under the trademark of PAPI or VORANATE, including VORANATE M220, PAPI 20 and PAPI 27 polymeric isocyanates. The polyfunctional isocyanates are present in a sufficient amount to impact the modulus of the cured compositions of the invention. If too much is used, the cure rate of the composition is unacceptably slowed down. If too little is used, the desired modulus levels are not achieved. The polyfunctional isocyanates may be present in an amount of 0 or greater based on the weight of the composition, about 0.5 percent by weight or greater, about 2 percent by weight or greater or about 3 percent by weight or greater. The polyfunctional isocyanates may be present in an amount of about 10 percent by weight or less based on the weight of the composition, about 9 percent by weight or less or about 8 percent by weight or less.

The compositions may also contain one or more catalysts which catalyzes the reaction of isocyanate moieties with isocyanate reactive moieties, i.e. water or an active hydrogen containing compound. The catalysts chosen may be selected to provide the desired cure profile. The compositions may be cured using standard catalytic systems or may be cured using latent curing systems. Among standard curing catalysts are organotin compounds, metal alkanoates, and tertiary amines. Mixtures of classes of catalysts may be used, such as a mixture of a tertiary amine and one or more of organotin compounds and metal alkanoates. Examples of mixed catalytic systems include tertiary amines, such as dimorpholino diethyl ether, and a metal alkanoate, such as bismuth octoate. Included in organotin compounds are alkyl tin oxides, stannous alkanoates, dialkyl tin carboxylates and tin mercaptides. Stannous alkanoates include stannous octoate. Alkyl tin oxides include dialkyl tin oxides, such as dibutyl tin oxide and its derivatives. Exemplary organotin compounds are dialkyltin dicarboxylates and dialkyltin dimercaptides. Dialkyl tin dicarboxylates with lower total carbon atoms may be more active catalysts in the compositions. Exemplary dialkyl dicarboxylates include 1,1-dimethyltin dilaurate, 1,1-dibutyltin diacetate and 1,1-dimethyl dimaleate. Preferred metal alkanoates include bismuth octoate or bismuth neodecanoate. The organo tin compounds or metal alkanoates may be present in an amount of about 60 parts per million or greater based on the weight of the composition, more preferably 120 parts by million or greater. The organo tin compounds or metal alkanoates may be present in an amount of about 1.0 percent or less based on the weight of the composition, more preferably 0.5 percent by weight or less and most preferably 0.2 percent by weight or less.

Exemplary tertiary amine catalysts include dimorpholinodialkyl ether, a di((dialkyl-morpholino)alkyl)ether, bis-(2-dimethylaminoethyl)ether, triethylene diamine, pentamethyldi-ethylene triamine, N,N-dimethylcyclohexylamine, N,N-dimethyl piperazine 4-methoxyethyl morpholine, N-methylmorpholine, N-ethyl morpholine, diazabicyclo compounds and mixtures thereof. An exemplary dimorpholinodialkyl ether is dimorpholinodiethyl ether. An exemplary di((dialkylmorpholino)alkyl)ether is (di-(2-(3,5-dimethylmorpholino)ethyl)-ether). Diazabicyclo compounds are compounds which have diazobicyclo structures. Exemplary diazabicyclo compounds include diazabicycloalkanes and diazabicyclo alkene salts. Some catalyst systems may comprise one or more diazabicycloalkanes and one or more diazabicyclo alkene salts. Exemplary diazabicycloalkanes include diazabicyclooctane, available from Air Products under the trademark and designations, DABCO, DABCO VVT, DABCO DC 1, DABCO DC 2, and DABCO DC 21. Exemplary diazabicycloalkene salts include diazabicycloundecene in the phenolate, ethylhexoate, oleate and formiate salt forms, available from Air Products under the trademark and designations, POLYCAT SA 1, POLYCAT SA 1/10, POLYCAT SA 102 and POLYCAT SA 610. Some catalyst systems contain one or more diazabicyclo compounds and one or more organo tin or metal alkanoate compounds and/or tertiary amine catalysts. Tertiary amines may be employed in an amount, based on the weight of the composition of about 0.01 percent by weight or greater, about 0.05 percent by weight or greater, about 0.1 percent by weight or greater or about 0.2 percent by weight or greater. Tertiary amines may be employed in an amount, based on the weight of the composition of about 2.0 percent by weight or less, about 1.5 percent by weight or less, or about 1.2 percent by weight or less.

The composition may contain ingredient one or more latent room temper-ature organometallic catalysts. The latent room temperature organometallic catalysts may be located in Part 2 or the curative side. A latent room temperature organometallic catalysts is a catalyst that functions to catalyze the reaction of the nucleophiles (polyols, polyamines) present in the polyol component with the isocyanates present in the isocyanate component. The latent organometallic catalyst may show delayed action. The latent room temperature catalysts may exhibit accelerated catalytic activity when exposed to temperatures at a temperature of 40° C. or greater. Any latent room temperature organometallic catalysts which provides good open time, acceptable initial lap shear strengths and which maintains an acceptable level of reactivity after partial curing and storage may be utilized. Exemplary classes of latent room temperature organometallic catalysts contain tin, zinc or bismuth. Exemplary latent room temperature organometallic catalysts include zinc alkanoates, bismuth alkanoates, dialkyltin alkanoates, dialkyl tin mercaptides, dialkyl tin bis(alkylmercaptoacetates), dialkyltin thioglycol-ates or mixtures thereof. Exemplary latent room temperature organometallic catalysts include zinc neoalkanoates, bismuth neoalkanoates, dialkyltin neoalkanoates, dialkyl tin mercaptides, dialkyl tin bis (alkylmercapto acetates), dialkyltin thioglycolates or mixtures thereof. The latent room temperature organometallic catalysts may be dialkyl tin mercaptides, dialkyl tin bis (alkylmercapto-acetates), dialkyltin thioglycolates or mixtures thereof. The latent room temperature organometallic catalysts may be dialkyltin thioglycolates or mixtures thereof. The alkyl groups on the latent room temperature organometallic catalysts may be any alkyl groups of about 1 or more carbon atoms or 4 or greater carbon atoms. The alkyl groups on the latent room temperature organometallic catalysts may be any alkyl groups of about 20 or less carbon atoms or 12 or less carbon atoms. Exemplary alkyls groups include methyl, butyl, octyl and dodecyl groups. The latent room temperature organometallic catalysts may be present in an amount sufficient to provide good open time, acceptable initial lap shear strengths and which maintains an acceptable level of reactivity after partial curing and storage. The latent room temperature organometallic catalysts may be present in an amount of about 0.005 percent by weight or greater based on the weight of polyol component, about 0.01 percent by weight or greater, about 0.020 percent by weight or greater, or about 0.030 percent by weight or greater. The latent room temperature organometallic catalysts may be present in an amount of about 1.0 percent by weight or less based on the weight of the polyol component, about 0.080 percent by weight or less, about 0.070 percent by weight or less or about 0.050 percent by weight or less. These amounts are based on active catalyst, and ignore the mass of solvents, inert compounds, or other materials as may be present in a commercially available catalyst product.

The two-part adhesive disclosed may contain one or more phenol blocked cyclic tertiary amines which function as latent catalysts. Any phenol blocked cyclic tertiary amine which provides good open time, acceptable initial lap shear strengths and which maintains an acceptable level of reactivity after partial curing and storage may be utilized. Exemplary phenol blocked cyclic tertiary amines include phenol blocked cyclic amidine catalysts, aromatic or cycloaliphatic structures with pending amines or aromatic or cycloaliphatic structures with nitrogens incorporated into the ring structures and the like. Exemplary cyclic amidine catalysts include 1,8-diazabicycloundec-7-ene (DBU) or 1,5-Diazabicyclo[4.3.0]non-5-ene (DBN) and the like. The blocking agent may be a phenolic compound such as phenol itself or a substituted phenol. The phenol-blocked cyclic amidine catalyst can be incorporated into either the polyol component or the polyisocyanate component. The phenol blocked cyclic tertiary amine catalyst may be present in an amount sufficient to provide good open time, acceptable initial lap shear strengths and which maintains an acceptable level of reactivity after partial curing and storage. The phenol blocked cyclic tertiary amine catalyst may be present in an amount of about 0.01 percent by weight or greater based on the weight of the polyol or polyisocyanate component or about 0.015 percent by weight or greater. The phenol blocked cyclic tertiary amine catalyst may be present in an amount of about 2.0 percent by weight or less based on the weight of the polyol or polyisocyanate component, about 1.0 percent by weight or less or about 0.025 percent by weight or less.

The two-part adhesive disclosed may contain one or more carboxylic acid blocked cyclic tertiary amine which may function as a latent catalyst. Any carboxylic acid blocked cyclic tertiary amine which provides good open time, acceptable initial lap shear strengths and which maintains an acceptable level of reactivity after partial curing and storage may be utilized. Exemplary carboxylic acid blocked cyclic tertiary amines include carboxylic acid blocked cyclic amidine com-pounds, aromatic or cycloaliphatic structures with pending amines or aromatic or cycloaliphatic structures with one or more nitrogen atoms incorporated into the ring structures and the like. Exemplary cyclic amidine catalysts include 1,8-diazabicycloundec-7-ene (DBU), or 1,5-Diazabicyclo[4.3.0]non-5-ene (DBN) and the like. The blocking agent may be one or more aliphatic carboxylic acids having 1 to 24 carbon atoms, especially 1 to 8 carbon atoms. The carboxylic acid-blocked tertiary amines can be incorporated into either the polyol component or the polyisocyanate component. The carboxylic acid blocked cyclic tertiary amines may be present in an amount sufficient to provide good open time, acceptable initial lap shear strengths and which maintains an acceptable level of reactivity after partial curing and storage. The carboxylic acid blocked cyclic tertiary amines may be present in an amount of about 0.01 percent by weight or greater based on the weight of the polyol or polyisocyanate component or about 0.015 percent by weight or greater. The carboxylic acid blocked cyclic tertiary amines may be present in an amount of about 2.0 percent by weight or less based on the weight of the polyol or polyisocyanate component, about 1.0 percent by weight or less or about 0.025 percent by weight or less.

The composition may further comprise stabilizers, which function to protect the composition from moisture, thereby inhibiting advancement and preventing premature crosslinking of the isocyanates in the curable composition. Stabilizers known to the skilled artisan for moisture curing adhesives may be used preferably herein. Included among such stabilizers are diethylmalonate, alkylphenol alkylates, paratoluene sulfonic isocyanates, benzoyl chloride, phosphoric acid and orthoalkyl formates. Such stabilizers are preferably used in an amount of about 0.1 percent by weight or greater based on the total weight of the curable composition, preferably about 0.5 percent by weight or greater and more preferably about 0.8 percent by weight or greater. Such stabilizers are used in an amount of about 5.0 percent by weight or less based on the weight of the curable composition, more preferably about 2.0 percent by weight or less and most preferably about 1.4 percent by weight or less.

Other components commonly used in curable compositions may be used in the compositions of this invention. Such materials are well known to those skilled in the art and may include ultraviolet stabilizers and antioxidants and the like. As used herein all parts by weight relative to the components of the curable composition are based on 100 total parts by weight of the curable composition. In compositions useful in preparing molded parts, the compositions may further comprise components commonly used in molding parts such as mold release agents, fillers, conductive components and the like. In compositions used to form foams, such compositions may further comprise ingredients commonly used in foam forming compositions, such as blowing agents, mold release agents, skin forming agents and the like.

The composition may be formulated by blending the components together using means well known in the art. Generally, the components are blended in a suitable mixer. Such blending is preferably conducted in an inert atmosphere in the absence of oxygen, for instance under vacuum, and atmospheric moisture to prevent premature reaction. The materials may be blended under vacuum or an inert gas, such as nitrogen or argon. The ingredients are blended for a sufficient time to prepare a well-blended mixture, for example from about 10 to about 60 minutes. The prepolymers are prepared prior to blending the components to form the two parts of the curable composition. The two parts of the composition are blended separately. Once the composition is formulated, it is packaged in a suitable container such that it is protected from moisture and oxygen to prevent premature crosslinking of the prepolymers containing isocyanate groups.

Part 1 and Part 2 may be formulated such that when the chosen volumes, for instance equal volumes, of the components are provided, the isocyanate index may be 1.0 to 1.8, 1.1 to 1.8, or 1.15 to 1.65. "Isocyanate index" is the ratio of the number of isocyanate groups in the part 1, the resin component, to the number of isocyanate-reactive groups in the part 2, the curative component. The isocyanate index, at a 1:1 volume ratio, may be 1.15 to 1.65.

The compositions may be used to bond a variety of substrates together as described hereinbefore. The two parts are contacted. The contacted composition is applied to a substrate and the composition on the first substrate is thereafter contacted with a second substrate. The surfaces to which the composition is applied may be cleaned and/or activated and/or primed prior to application; see for example, U.S. Pat. Nos. 4,525,511; 3,707,521 and 3,779, 794, all are incorporated herein by reference in their entirety. Curing can be accelerated by applying heat to the curing composition by means of convection heat, impingement heat, IR heating, induction heating, microwave heating and the like. The adhesive composition may be formulated to provide an open time of at least about 3 minutes or greater or about 5 minutes or greater. "Open time" is understood to mean the time after application of the composition to a first substrate until it starts to become a high viscous paste and is not subject to deformation during assembly to conform to the shape of the second substrate and to adhere to it. The compositions preferably may exhibit tack free times of about 3 minutes or greater or about 5 minutes or greater.

In use, the components of two-part compositions are mixed. For two-part compositions to be most easily used in commercial and industrial environments, the volume ratio at which the two parts are combined may be a convenient whole number. This facilitates application of the curable composition with conventional, commercially available dispensers including static and dynamic mixing. Such dispensers with static mixing are shown in U.S. Pat. Nos. 4,538,920 and 5,082,147 (incorporated herein by reference) and are available from Conprotec, Inc. (Salem, N.J.) under the trade name MIXPAC or SULZER™ QUADRO of Sulzer Ltd., Switzerland. Typically, these dispensers use a pair of tubular receptacles arranged side-by-side with each tube being intended to receive one of the two parts of the polymerizable composition. Two plungers, one for each tube, are simultaneously advanced (e.g., manually or by a hand-actuated ratcheting mechanism) to evacuate the contents of the tubes into a common, hollow, elongated mixing chamber that may also contain a static mixer to facilitate blending of the two parts. The blended polymerizable composition may be extruded from the mixing chamber onto a substrate. When using electrically-driven equipment, dynamic mixing may be used. Once the tubes have been emptied, they can be replaced with fresh tubes and the application process continued. The volumetric ratio at which the two parts of the polymerizable composition are combined is controlled by the diameter of the tubes. (Each plunger is sized to be received within a tube of fixed diameter, and the plungers are advanced into the tubes at the same speed.) A single dispenser is often intended for use with a variety of different two-part polymerizable compositions and the plungers are sized to deliver the two parts of the polymerizable composition at a convenient mix ratio. Some common mix ratios are 1:1, 2:1, 4:1 and 10:1 and can also be odd ratios. Preferably, the two parts are blended at a mix ratio of about 1:1.

The mixed two-part compositions may have a suitable viscosity to allow application without dripping. The viscosities of the two individual components may be of the same order of magnitude. For lower viscosities, the components may require gelling agent known in the art to prevent sag of the uncured adhesive system. Two-part adhesive compositions start to cure upon mixing the two parts.

Disclosed is a process for bonding two substrates. The polyol component and the isocyanate component are mixed to form the mixed adhesive. The mixed composition is formed into an adhesive layer between and in contact with the two substrates. An adhesion promoter may be applied to one or both of the substrates prior to contacting the substrate(s) with the adhesive. The adhesive layer is then cured between and in contact with the two substrates to form a layer of cured adhesive bonded to each of the two substrates.

The polyol component and isocyanate component often will react spontaneously upon mixing at room temperature (about 22° C.) and cure without the need to heat the adhesive to a greater temperature. Curing may be effected by simply mixing the components at a temperature of, for example, 0 to 35° C. and allowing the components to react at that temperature. At about room temperature, the two-part adhesive may exhibit an open time of about 3 minutes or greater, about 5 minutes or greater, about 8 minutes or greater, about 9 minutes or greater or 10 to 15 minutes, measured as described in the following examples.

Heating can be applied to the adhesive to obtain a more rapid cure. The polyol and isocyanate components can be heated separately and then mixed and cured, with or without further applied heat. Alternatively, the polyol and isocyanate components can be mixed at a lower temperature, such as 0 to 35° C. and then heated to a higher cure temperature. The substrate can be heated before applying the adhesive if desired. If an elevated temperature is used in the curing step, such a temperature may be, for example, about 36° C. or greater, or about 50° C. or greater. Such a temperature may be, for example, about 150° C. or less, or about 130° C. or less.

A layer of the two-component polyurethane adhesive may be formed at a bondline between two substrates to form an assembly. The adhesive layer is then at least partially cured at the bondline by applying infrared radiation to the assembly. Infrared radiation may be applied, for example, until the temperature of the adhesive layer reaches about 80° C. or greater, or about 90° C. or greater, or about 150° C. or less, or about 130° C. or less. The assembly so heated may be maintained under infrared radiation until the adhesive layer has been exposed to such temperatures for a period of 5 seconds or more to effect the partial or complete cure. For example, the infrared radiation may be continued until the temperature of adhesive layer is 80 to 150° C., preferably 90 to 130° C., for 5 to 60 seconds, 5 to 45 seconds, for 10 to 30 seconds or for 10 to 20 seconds, at which time the exposure to infrared radiation is discontinued.

If only a partial cure is performed by applying infrared radiation, the partial curing can be either or both of two types. In one type of partial curing, the entire adhesive layer is cured, but only partially. Such partial curing preferably is at least to the gel point, at which a three-dimensional polymeric network is formed in the adhesive layer by the curing of the components. In another type of partial curing, only one or more predetermined, localized portions of the adhesive layer at the bondline are cured. This produces an adhesive layer having at least partially cured portions and portions that have undergone little or no cure. The predetermined, localized portions of the adhesive layer may constitute, for example, 5 to 80%, 5 to 50% or 5 to 25% of the total area of the adhesive layer. Subsequent to the partial curing step, the uncured or only partially cured portions of the adhesive layer then are cured further to form a fully-cured adhesive. The subsequent step of completing the cure can be done at approximately room temperature (such as from 15 to 35° C.) or an elevated temperature such as greater than 35° C. to 80° C.

A two-step curing process as just described is useful in a variety of manufacturing, building and construction, and in-field assembly and repair applications. By performing only a partial cure by applying infrared radiation, a rapid bonding of the adhesive to the substrate can be obtained in a very short time, often a matter of 10 seconds to 2 minutes. The bonded parts can be handled after 1 hour or less from partial cure, after about 10 minutes or less after partial cure, about 3 minutes or less after partial cure or about 1 minute or less after partial cure. This initial bond is often robust enough that the assembly can withstand further handling. Further handing may include, for exam-ple, transporting the assembly to a downstream work station, and further manufacturing steps which might include joining the assembly to one or more other components, various shaping and/or machining steps, the application of a coating, and the like. The completion of the cure can take place during and/or after such additional handling steps. Often, the adhesive will fully cure without exposing it to elevated temperature, infrared radiation or other energy source, due at least in part to the catalytic action of the organometalic catalyst. The acid-blocked cyclic amidine catalyst may de-block during the infrared heating stage, to produce an active catalyst that promotes the cure during the subsequent curing step, even if that subsequent step is performed without additional applied energy.

The substrates are not limited. They may be a metal, a metal alloy, an organic polymer, a lignocellulosic material such as wood, cardboard or paper, a ceramic material, various types of composites, or other materials. Carbon fiber reinforced plastic is a substrate of particular interest. The substrates in some embodiments are vehicular parts or vehicular sub-assemblies that are adhered together with a cured adhesive composition disclosed. The substrates may be are individual plies that are glued together using the adhesive to form a multilayer laminate. The substrates may be building members.

Other components commonly used in curable compositions may be used in the compositions disclosed. Such materials are well known to those skilled in the art and may include ultraviolet stabilizers and antioxidants and the like. The compositions may also contain durability stabilizers known in the art. Exemplary durability stabilizers are alkyl substituted phenols, phosphites, sebacates and cinnamates. One class of durability stabilizers includes organophosphites. The organophosphites may be present in a sufficient amount to enhance the durability of bond of the adhesive composition to the substrate surface. Such phosphites are disclosed in Hsieh et al. U.S. Pat. No. 7,416,599 column 10, line 47 to Column 11 line 25, incorporated herein by reference. Exemplary organophosphites are poly(dipropyleneglycol) phenyl phosphite (avail-able from Dover Chemical Corporation under the trademark and designation DOVER-PHOS 12), tetrakis isodecyl 4,4'isopropylidene diphosphite (available from Dover Chem-ical Corporation under the trademark and designation DOVERPHOS 675), and phenyl diisodecyl phosphite (available from Dover Chemical Corporation under the trademark and designation DOVERPHOS 7). The organophosphite may be present in the composition in an amount of about 0.1 percent by weight or greater or about 0.2 percent by weight or greater based on the weight of the composition. The organophosphite may be present in the composition in an amount of about 1.0 percent by weight or less or about 0.5 percent by weight or less based on the weight of the composition.

The composition may be formulated by blending the components together using means well known in the art. Generally, the components are blended in a suitable mixer. Such blending is preferably conducted in an inert atmosphere in the absence of oxygen and atmospheric moisture to prevent premature reaction The compositions disclosed may be formulated to provide an open time of about 5 minutes or greater, 7 minutes or greater, about 8 minutes or greater or about 9 minutes or greater. The two part adhesive compositions may be formulated to provide an open time of about 20 minutes or less or about 15 minutes or less. "Open time" is understood to mean the time after application of the composition to a first substrate until it starts to become a high viscous paste and is not subject to deformation during assembly to conform to the shape of the second substrate and to adhere to it. Open time may be measured by rheology reactivity wherein the rheology reactivity is about 500 seconds or greater or about 600 seconds or greater.

The composition for the two components preferably is selected so that the cured adhesive (e.g., after 7 days cure at 23° C. and 50 percent relative humidity) has a glass transition temperature of about −10° C. or less, preferably about −20° C. or less, more preferably about −30° C. or less, and most preferably about −35° C. or less. More preferred composition have two or more glass transition temperatures, including a first glass transition temperature of about −5° C. or less and a second glass transition temperature of about 30°

C. or more. Preferably, the first glass transition temperature is about −10° C. or less, preferably about −20° C. or less, more preferably about −30° C. or less, and most preferably about −35° C. or less. The first glass transition temperature may be about −110° C. or more, or about −60° C. or more. The second glass transition temperature preferably is about 35° C. or more, more preferably about 40° C. or more, even more preferably about 50° C. or more, even more preferably about 60° C. or more, and most preferably about 70° C. or more.

Molecular weights as described herein are number average molecular weights, unless otherwise specified, which may be determined by Gel Permeation Chromatography (also referred to as SEC). For polyurethane prepolymers, it is also possible to calculate approximate number average molecular weight from the equivalent ratio of the isocyanate compounds and of the polyol compounds with which they are reacted as known to the persons skilled in the art.

ILLUSTRATIVE EMBODIMENTS OF THE INVENTION

The following examples are provided to illustrate the invention, but are not intended to limit the scope thereof. All parts and percentages are by weight unless otherwise indicated.

Modulus at different temperatures are measured with a DMA method on a TA instruments equipment AR 2000EX. Modulus are measured in a temperature range between −100° C. up to 120° C. at a heating rate of 5° C./min. Measurements are per-formed in torsional mode with a constant OZSS stress of 100000 Pa and a frequency of 1 Hz. Sample specimens of 2 mm thickness, 12.5 mm width and 60 mm length are measured.

Tensile strength, elongation at break, Young's modulus are measured according to DIN 53 504, on 2 mm thick, fully cured test specimens at displacements of 2%-5%. The standard deviation of the Young's modulus measurement is approximately 10%, the standard deviation of the tensile strength measurement is approximately 5% and standard deviation of the elongation at break is approximately 15%.

Exposure. The cataplasm exposure cycle is defined as (1) 7 days at 23° C. at 50% relative humidity (rh.), (2) 7 d of cataplasm. Cataplasma treatment includes the packaging of the sample with cotton and saturation of the cotton packaging with 10-fold water and consecutively wrapping in aluminum foil and polyethylene foil to avoid evaporation. The packed sample is exposed 7 days at 70° C., 16 hours at −20° C., brought to ambient temperature and the unwrapped sample stored for 2 hours at 23° C.

The polyol components are prepared in a batch process. Typical batch sizes are 5 KG in laboratory scale, 20 KG in pilot plant scale and 1000 KG and more in manufacturing scale. The polyol components are prepared in a planetary mixer. Alternatively, a dissolver mixer can be used. All liquid components are added to the mixer according to the weight percent as defined in table 1 at ambient temperature. Liquid components are defined as polyols and catalysts. Prior to the addition of the fillers vacuum is applied, in order evacuate the liquid phase and remove potential air entrapments. Typically vacuum of 1000 mPa is applied. The fillers are added in weight percentages as defined in table 1 to the liquid phase under stirring within 15 min. In case dissolver technologies are applied typical agitation rates are 600 rpm. Mixing is continued under ambient pressure for additional 5 min. The mixture is further agitated under vacuum for additional 30 min at a typical pressure of approx. 80 bar. In case dissolver technologies are applied typical agitation rates are 400 rpm. The shear applied during mixing causes a temperature increase of the mixture. After complete mixing, the mixing vessel is flushed with nitrogen.

The isocyanate components are prepared in a batch process. Typical batch sizes are 5 KG in laboratory scale, 20 KG in pilot plant scale and 1000 KG and more in manufacturing scale. The isocyanate components are prepared in a planetary mixer. Alternatively, a dissolver mixer can be used. The prepolymer, which is used in the isocyanate component can be prepared in an in-situ process as described below. All liquid components are added to the mixer according to the weight percent as defined in table 2 at ambient temperature. Additionally, 50% of the fillers are added to the mixture under agitation in order to pre-disperse the fillers. The remaining 50% of the fillers are added under increased agitation. In case dissolver technology is used, the additional fillers are added at a typical agitation rate of 400 rpm. Mixing is continued at ambient temperature under vacuum for 20 min to obtain a homogeneous mixture. Typical vacuum values of 1000 mbar is applied. In order to complete the polymerization process, the temperate is raised to 85° C. Additionally vacuum is applied in order to evacuate the reaction mixture. Typically, a vacuum of 80 mbar is applied. Mixing at 85° C. at 80 mbar pressure is continued for 45 min. Mixing is typically done at 400 rpm, in case a dissolver technology is used. Mixing is continued for further 90 min at temperature of min 75° C. and maximum 80 mbar pressure at increased agitation rates. Typical agitation rates in case a dissolver technology is used are 1000 rpm. Mixing is continued at reduced agitation rates under cooling for additional 40 min in order to reduce the temperature of the reaction mixture to approx. 40° C. In case a dissolver technology is used, the dissolver is switched off. After complete mixing, the mixing vessel is flushed with nitrogen.

Ingredients Non Hydrophobic Polyol 1 Polyalkyleneoxide triol, Voranol CP 4610 polyol, having a molecular weight of 4500.

Polyalkylene oxide amine 1 is a polyoxyalkylene amine available as Jeffamine D 403.

Polyalkylene oxide amine 2 is a glycerin initiated polyglycol amine, Jeffamine 400 polyamine, having a molecular weight of 400.

bismuth-carboxylate catalyst available under the tradename and designation TIB 720

1,8-Diazabicyclo[5.4.0]undec-7-ene ("DBU", CAS 229-713-7) carboxylic acid blocked catalyst available under the tradename and designation TOYOCAT DB 41

Dibutyl tin dilaurate.

1,4-diazabicyclo[2.2.2]octane available under the trademark and designation DABCO 33LV. thermosensitive amine catalyst available under the tradename and designation TOYOCAT F-22 KaMin 100C (IMERYS) is pre-dried calcined China clay (55% SiO2, 45% Al2O3) with an average particle size of approx. 2 μm (90%>10 μm), a BET surface of 8.5 m2/g and a pH of 6.0-6.5.

Molecular sieve 3A

Monomix G is a talcum based filler, available from Imerys, containing approx. 61% $SiO_2$ and approx. 31% MgO with a medium particle size of 2.5 to 5.3 μm.

Aerosil R 202 is hydrophobically modified polydimethylsiloxane coated fumed silica Two polyol formulations are prepared using the ingredients listed in Table 1. Polymeric methylene diphenyl isocyanate available under the trademark and designation Voranate M220 having a functionality of 2.7 and an equivalent weight of about 136. Carbodiimide modified methylene diphenyl di-isocyanate, available under the Trademark and designation, ISONATE M143, having a functionality of 2.2 and an equivalent weight of 143. Voranol 400 is a polypropylene glycol homopolymer with an average molecular weight of 212 g/mol molecular weight and an OH number of approx. 55 mg KOH/g, available from the DOW Chemical Company.

Voranol 2000L is a polypropylene glycol homopolymer with an average equivalent molecular weight of 1000 g/mol molecular weight and a OH number of approx. 55 mg KOH/g, available from the DOW Chemical Company.

Voranol CP4610 is a glycerin initiated propoxylated and ethoxylated based triol with an average equivalent molecular weight of 1603 g/mol molecular weight and an OH number of approx. 35 mg KOH/g, available from the DOW Chemical Company.

Poly bd© R20LM is a liquid hydroxyl terminated polymer of butadiene with a molecular weight of 1300 g/mol and a polydispersity of 2, available from Cray Valley.

Vorapel™ D3201 is a hydrophobically modified (polybutyleneoxide)diol with an average molecular weight of 1921-2125 g/mol and an OH number of approx. 56 mg KOH/g, available from the DOW chemical Company.

Poly THF is a poly(tetramethylene-oxide)diol with a molecular weight of 1950-2050 g/mol and a hydroxyl number of 54.7-57.5.

Cured compositions are prepared from the listed polyol and isocyanate formulations in Table 3 by the process The results of testing of the compositions after cure are shown in Table 3.

TABLE 1

| | Example 1 | Example 2 |
|---|---|---|
| | Example Abbreviation/Description | |
| | POLY 1 | POLY 2 |
| Material/Ingredient | Amount | Amount |
| Non Hydrophobic Polyol 1 | 44.3 | 51.0 |
| Mono ethylene glycol | | 7.2 |
| 1.4 Butanediol | 9.6 | |
| Polyalkylene oxide amine 1 Jeffamin T-403 | | 3.5 |
| Polyalkylene oxide amine 2 | 0.6 | |
| dioctyltinmercaptide catalyst | | 0.1 |
| bismuth-carboxylate catalyst | 0.1 | |
| 1,8-Diazabicyclo[5.4.0]undec-7-ene carboxylic acid blocked catalysts | | 0.8 |
| thermosensitive amine catalyst | 0.3 | |
| 1,4-diazabicyclo[2.2.2]octane | | 0.1 |
| Monomix G | | 35.3 |
| Calcined china clay | 43.6 | |
| hydrophobically modified polydimethylsiloxane coated fumed silica | 1.5 | 1.0 |
| molecular sieve | | 1.0 |

Isocyanate functional prepolymers are prepared from the ingredients listed in Table 2.

Table 3 shows properties of inventive and comparative 2K polyurethane adhesives using a 1:1 mixer, including Young's modulus, shear strength and elongation at break at ambient temperature.

The data refer to mixed 2K polyurethane adhesives, based on a 1:1 mixture of the specified poly and isocyanate components. Data are generated according DIN Norm with T-bone samples if not indicated with DMA. DMA marked data on the temperature dependency of the Young's modulus are generated with DMA measurements.

TABLE 2

Recipes of isocyanate component.

| | Example 3 | Example 4 | Example 5 | Example 6 | Example 7 | Example 8 |
|---|---|---|---|---|---|---|
| Example Abbreviation/ Description | ISO 1 | ISO 2 | ISO 3 | 1SO4 | ISO 5 | ISO 6 |
| Technology | Voranol™ 1010L 100 | Voranol™ 1010L 100 | POLYBD R20LM 100 | POLYBD R20LM 100 | PTHF 2000 100 | Vorapel™ D3200 100 |
| Material/Ingredient | Amount | Amount | Amount | Amount | Amount | Amount |
| Isonate M 143 | 12.5 | 44.2 | 12.5 | 42.8 | 41.5 | 41.7 |
| Desmodur N 3400 | 5 | 5.0 | 5 | 5.0 | 5.0 | 5.0 |
| Voranate M 220 | 36 | | 36 | | | |
| Voranol ™ 400 | 5 | | 5 | | | |
| Voranol ™ 1010L | 12.5 | 18.2 | | | | |
| Vorapel ™ D3201 | | | | | | 18.2 |
| PTHF 2000 | | | | | 18.2 | |
| POLYBD R20LM | | | 12.5 | 18.2 | | |
| KaMin 100 C | 27.35 | 31.1 | 27.35 | 32.5 | 33.8 | 33.6 |
| Aerosil R 202 | 1.5 | 1.5 | 1.5 | 1.5 | 1.5 | 1.5 |

| | Example 9 | Example 10 | Example 11 | Example 12 | Example 13 | Example 14 |
|---|---|---|---|---|---|---|
| Example Abbreviation/ Description | ISO 7 | ISO 8 | 1SO 9 | ISO 10 | ISO 11 | ISO 12 |
| Technology (ratio) | Vorapel™ D 3201/ polyBD 20/80 | Vorapel™ D 3201/ polyBD 50/50 | Vorapel™ D 3201/ polyBD 80/20 | Voranol™ 1010L/ polyBD 20/80 | Voranol™ 1010L/ polyBD 50/50 | Voranol™ 1010L/ polyBD 80/20 |
| Material/Ingredient | Amount | Amount | Amount | Amount | Amount | Amount |
| Isonate M 143 | 42.8 | 42.5 | 42.0 | 43.3 | 43.6 | 44.0 |
| Desmodur N 3400 | 5.0 | 5.0 | 5.0 | 5.0 | 5.0 | 5.0 |
| Voranate M 220 | | | | | | |
| Voranol ™ 400 | | | | | | |

TABLE 2-continued

| | | | | | | |
|---|---|---|---|---|---|---|
| Voranol ™ 1010L | | | | 3.6 | 9.1 | 14.6 |
| Vorapel ™ D 3201 | 3.6 | 9.1 | 14.6 | | | |
| PTHF 2000 | | | | | | |
| POLYBD R20LM | 14.6 | 9.1 | 3.6 | 14.6 | 9.1 | 3.6 |
| KaMin 100 C | 32.5 | 32.8 | 33.3 | 32.0 | 31.7 | 31.4 |
| Aerosil R 202 | 1.5 | 1.5 | 1.5 | 1.5 | 1.5 | 1.5 |

The wet-heat exposure performance of the examples of the disclosed composition and comparative examples are evaluated based on the change of the young's modulus of adhesives samples that are cured at 7 d ambient temperature vs. samples that are additionally exposed to a 7 d cataplasm (70° C., 100% relative humidity) treatment.

The temperature stability performance of inventive and comparative examples are evaluated based on the change of the modulus of adhesives samples measured at −30° C., 23° C. and 85° C.

TABLE 3

| | Example 15 | Example 16 | Example 17 | Example 18 | Example 19 | Example 20 |
|---|---|---|---|---|---|---|
| Example Abbreviation | POLY 2 ISO 1 comparative | POLY 1 ISO 2 comparative | POLY 2 ISO 3 comparative | POLY 1 ISO 4 inventive | POLY 1 ISO 5 inventive | POLY 1 ISO 6 inventive |
| Polyols | Voranol ™ 1010L-MEG 100 | Voranol ™ 1010L-BDO 100 | POLYBD R20LM-MEG 100 | POLYBD R20LM-BDO 100 | PTHF-BDO 100 | Vorapel ™ D3201-DBO 100 |
| | | | Properties (1:1 ratio of POLY and ISO) | | | |
| Young's modulus (MPa) | 271 (2) | 187 (7) | 578 (20) | 360 (28) | 330 (17) | 253 (23) |
| Young's modulus after cataplasm (MPa) | 115 | 155 (7) | 298 (10) | 389 (24) | 342 (15) | 222 (12) |
| Young's modulus change after cataplasm (% loss) | 58% | 17% | 48% | 8% | 4% | 12% |
| Elongation at break, at ambient (%) | 77 | 79 | 47 | 42 | 62 | 67 |
| Shear strength (Mpa) (std. deviation) | 18.3 (1.0) | 18.9 (0.8) | 16.8 (0.2) | 18.0 (0.8) | 20.0 (1.7) | 17.0 (0.3) |
| Modulus DMA, at −35° C. (MPa) | 1710 | 1764 | 1365 | 909 | 777 | 958 |
| Modulus DMA, at 23° C. (MPa) | 351 | 129 | 322 | 234 | 196 | 146 |
| Modulus DMA, at 85° C. (MPa) | 34 | 33 | 15 | 55 | 61 | 40 |
| Modulus DMA, 23° C./85° C., ratio | 10 | 4 | 21 | 4 | 3 | 4 |
| Modulus DMA, −35° C./23° C., ratio | 5 | 14 | 4 | 4 | 4 | 7 |
| Tg by DMA/tan delta (° C.) | 57 | 3 | 64 | −39, 79 | −42, 71 | −32/33 |

| | Example 21 | Example 22 | Example 23 | Example 24 | Example 25 | Example 26 |
|---|---|---|---|---|---|---|
| Example Abbreviation | POLY 1 ISO 7 inventive | POLY 1 ISO 8 inventive | POLY 1 ISO 9 inventive | POLY 1 ISO 10 comparative | POLY 1 ISO 11 inventive | POLY 1 ISO 12 comparative |
| Polyols | Vorapel ™ D 3201/ polyBD-DBO 20/80 | Vorapel ™ D 3201/ polyBD-DBO 50/50 | Vorapel ™ D 3201/ polyBD-BDO 80/20 | Voranol ™ 1010L/ polyBD-DBO 20/80 | Voranol ™ 1010L/ polyBD-DBO 50/50 | Voranol ™ 1010L/ polyBD-BDO 80/20 |

TABLE 3-continued

| Properties (1:1 ratio of POLY and ISO) | | | | | | |
|---|---|---|---|---|---|---|
| Young's modulus (MPa) | 284 (34) | 264 (26) | 233 (25) | 269 (6) | 189 (25) | 179 (17) |
| Young's modulus after cataplasm (MPa) | 218 (14) | 243 (50) | 247 (23) | 186 (22) | 175 (13) | 146 (6) |
| Young's modulus change after cataplasm (% loss) | 23% | 8% | 6% | 37% | 7% | 18% |
| Elongation at break, at ambient (%) | 60 (0) | 60 (3) | 64 (4) | 53 (6) | 77 (9) | 82 (9) |
| Shear strength (Mpa) (std. deviation) | 17.0 (0.1) | 17 (0.4) | 16.8 (0.3) | 15.4 (0.8) | 17.8 (0.6) | 17.0 (0.6) |
| Modulus DMA, at −35° C. (MPa) | 681 | 723 | 1024 | 822 | 1269 | 1569 |
| Modulus DMA, at 23° C. (MPa) | 135 | 135 | 162 | 133 | 155 | 142 |
| Modulus DMA, at 85° C. (MPa) | 35 | 40 | 43 | 32 | 36 | 39 |
| Modulus DMA, 23° C./85° C., ratio | 4 | 3 | 4 | 4 | 4 | 4 |
| Modulus DMA, −35° C./23° C., ratio | 5 | 5 | 6 | 6 | 8 | 11 |
| Tg by DMA/tan delta (° C.) | −35/63 | −33/82 | −31/80 | 12 | 0 | 0 |

All Voranol™ 1010L prepolymer, MEG hard segment based recipe POL 2 – ISO 1 reveal a significant 58% drop of Young's modulus after cataplasm exposure. The Young's modulus of 351 MPa @ 23° C. decreases significantly by a factor of 10 to a 35 MPa @ 85° C.. The hydrophilic nature of soft segment and hard segment facilitates water uptake during cataplasm exposure, which results in a plasticizing effect and decrease of modulus. Similar polarity soft and hard segment results in loss of phase separation at already comparably low temperatures of 57° C. ($T_g$), resulting in a significant drop of modulus (e.g., Young's modulus or shear storage modulus) in a temperature range from −35° C. to 85° C.. The modulus drops significantly by a factor of 10 from 352 MPa @ 23° C. to 35 MPa @ 85° C..

Change to the more hydrophobic hard segment 1,4-butanediol in recipe POL 1-ISO 2 results in a significantly improved wet-heat stability after cataplasm exposure, with a change of only 17%. But the decrease of modulus (e.g., Young's modulus or shear storage modulus) over temperature is with a factor of 14 between −35° C. and 23° C. still very high.

The change to a more hydrophobic polyBD soft segment moiety and hydrophilic hard segment moiety MEG in recipe POL 2-ISO 3 does not result in a performance improvement. The drop of young's modulus after cataplasm exposure is of 48% is very high. The change in Young's modulus over temperature with a factor of 21 between 23° C. and 85° C. is very high.

The change of the hard-soft segment design of the claimed formulations POL 1-ISO 4, POL 1-ISO 5, POL 1-ISO 6, shows improved wet-heat as well as temperature stability performance.

Compositions containing hydrophobic 1,4 butandiol hard segment moieties and with hydrophobic soft segments polyBD (ISO 4), polyTHF (ISO 5) and (polybutyleneoxide)-diol (ISO 6) show a decrease of Young's modulus of only 4 to 12% which demonstrates excellent wet-heat stability. The change of modulus (e.g., Young's modulus or shear storage modulus) over temperature ranges from −35° C. to 23° C. and from 23° C. to 85% exhibits factors of 3 to 7 which is very low. modulus (e.g., Young's modulus or shear storage modulus) @ 85° C. with 40-60 MPa is very high.

Further modification of soft segment design of disclosed compositions POL 1-ISO 7, POL 1-ISO 8, POL 1-ISO 9 result in similar performance. Mixtures of (polybutyleneoxide)-diol and polyBD in ratios of 20:80 (ISO 7), 50:50 (ISO 8) and 80:20 (ISO results in similarly good wet-heat exposure and temperature Yet further modification of the soft segment moieties result in disclosed compositions with differentiated performance. Recipes POL 1-ISO 10-12 are based on mixtures of Voranol™ 1010L and polyBD R20LM.

The change of modulus (e.g., Young's modulus or shear storage modulus) over temperature ranges from −35° C. to 23° C. and from 23° C. to 85% exhibits factors of 3 to 7 which is very low. Young's modulus @ 85° C. with 40-60 MPa is very high.

What is claimed is:

1. A composition comprising two parts including a Part 1 and a Part 2, wherein the Part 1 comprises:
   a) one or more prepolymers having isocyanate functional groups and hydrophobic segments in the backbone of the prepolymers, wherein the hydrophobic segments comprise the residue of one or more polybutadiene diols, polybutyleneoxide diols, or hydrophobic polyester diols, and wherein the hydrophobic segments comprise from about 4 percent to about 60 percent by weight of the one or more prepolymers;

and the Part 2 comprises:
   b) about 0.2 to about 6 percent of a polyoxyalkylene amine by weight of Part 2;
   c) about 3 to about 12 percent of 1,4-butanediol by weight of Part 2; and
   d) about 20 to about 60 percent of a polyalkyleneoxide triol by weight of Part 2;
   wherein Parts 1 and 2 are not mixed prior to curing.

2. The composition according to claim 1, wherein the one or more polybutadiene diols, polybutyleneoxide diols, or hydrophobic polyester diols are homopolymers.

3. The composition according to claim 1, wherein the hydrophobic segments comprise from about 5 percent to about 55 percent by weight of the prepolymer.

4. The composition according to claim 1, wherein the one or more prepolymers having isocyanate functional groups have an isocyanate functionality of about 2.0 to about 3.0.

5. The composition according to claim 1, comprising, based on the total weight of the composition, a) from about 5 to about 40 percent by weight of the one or more prepolymers having isocyanate functional groups and the residue of hydrophobic segments in the backbone of the prepolymers.

6. The composition according to claim 1, containing one or more catalysts.

7. The composition according to claim 1, containing one or more fillers in one or both parts.

8. A method of bonding two or more substrates together comprising i) contacting the Part 1 and the Part 2 of claim 1 and forming a mixture; ii) contacting the mixture with one or more substrates; iii) contacting the substrates together with the mixture disposed between the substrates; and iv) curing the mixture so as to bond the substrates together.

9. The method of claim 8, wherein the cure of the mixture is accelerated by exposing the substrates and/or the substrates with the mixture disposed between the substrates to an elevated temperature.

10. The composition according to claim 1, wherein the hydrophobic segments comprise from about 7 percent to about 50 percent by weight of the prepolymer.

11. The composition according to claim 1, wherein the one or more prepolymers have an isocyanate functionality of about 2.0 to about 2.7.

12. The composition according to claim 1, wherein the one or more prepolymers have an isocyanate functionality of about 2.1 to about 2.7.

13. The composition according to claim 7, wherein the one or more fillers are comprised in an amount of about 25 to about 75 percent by weight based on the weight of the composition.

14. The composition according to claim 1, wherein the hydrophobic segments comprise the residue of a hydroxy terminated polymer of butadiene, a poly(tetramethylene oxide) diol, or a hydrophobically modified (polybutyleneoxide) diol.

15. The composition according to claim 1, wherein the polyoxyalkylene amine is a glycerin-initiated polyglycol amine.

16. The composition according to claim 1, comprising about 0.3 to about 4 percent of the polyoxyalkylene amine by weight of Part 2.

17. The composition according to claim 1, comprising about 0.5 to about 2 percent of the polyoxyalkylene amine by weight of Part 2.

18. The composition according to claim 1, wherein the polyoxyalkylene amine has a molecular weight of about 200 to about 5,000 g/mol.

19. The composition according to claim 1, wherein the polyoxyalkylene amine has a molecular weight of about 400 to about 3,000 g/mol.

20. The composition according to claim 1, comprising about 6 to about 10 percent of 1,4-butanediol by weight of Part 2.

* * * * *